(12) United States Patent
Kubota et al.

(10) Patent No.: US 7,208,915 B2
(45) Date of Patent: Apr. 24, 2007

(54) CONSTANT-CURRENT BATTERY CHARGER

(75) Inventors: Atsumasa Kubota, Hikone (JP);
Tatsuya Miwa, Sakata-gun (JP);
Masaki Ikeda, Hikone (JP); Naoki Shimizu, Inukami-gun (JP)

(73) Assignee: Matsushita Electric Works, Ltd., Kadoma-Shi (JP)

( * ) Notice: Subject to any disclaimer, the term of this patent is extended or adjusted under 35 U.S.C. 154(b) by 0 days.

(21) Appl. No.: 11/237,786

(22) Filed: Sep. 29, 2005

(65) Prior Publication Data
US 2006/0076921 A1 Apr. 13, 2006

(30) Foreign Application Priority Data
Sep. 30, 2004 (JP) ............................. 2004-286718

(51) Int. Cl.
*H02J 7/00* (2006.01)
(52) U.S. Cl. .................................... 320/134
(58) Field of Classification Search ............... 320/134, 320/107, 128, 136, 150
See application file for complete search history.

(56) References Cited
U.S. PATENT DOCUMENTS

| | | | | | |
|---|---|---|---|---|---|
| 5,619,118 | A | * | 4/1997 | Reipur et al. | 320/145 |
| 5,686,812 | A | * | 11/1997 | Hotta | 320/134 |
| 5,864,220 | A | * | 1/1999 | Reipur et al. | 320/134 |
| 6,326,770 | B1 | | 12/2001 | Patino et al. | 320/132 |
| 2001/0000212 | A1 | | 4/2001 | Reipur et al. | 320/104 |

FOREIGN PATENT DOCUMENTS

JP 08-336236 12/1996

OTHER PUBLICATIONS

European Search Report dated Nov. 16, 2005.

\* cited by examiner

*Primary Examiner*—Pia Tibbits
(74) *Attorney, Agent, or Firm*—Armstrong, Kratz, Quintos, Hanson & Brooks, LLP.

(57) ABSTRACT

A constant-current battery charger includes a power supply for supplying a charge current to a secondary cell, and a current monitor for monitoring a charge current being supplied to the cell. A controller is included for varying the charge current in accordance with the monitored charge current. The controller calculates a current difference between a predetermined target current and the instant charge current, and generates a demand of varying the charge current at a first charge rate when the current difference is out of a predetermined range, and varying the charge current at a second charge rate when the current difference is within the predetermined range. The controller generates the demand repeatedly at regular or varying intervals for varying the charge current. The first charge rate is set to be higher than the second charge rate in order to make a rapid charging until it comes close to the target current. Since the current difference between the instant charge current and the target current is relied upon to switch the charge rate between the first and second charge rates, the switching can be made at an exact timing truly indicative of the condition of the battery, which enables a rapid charging, yet assuring to complete the charging successfully.

9 Claims, 3 Drawing Sheets

FIG. 2
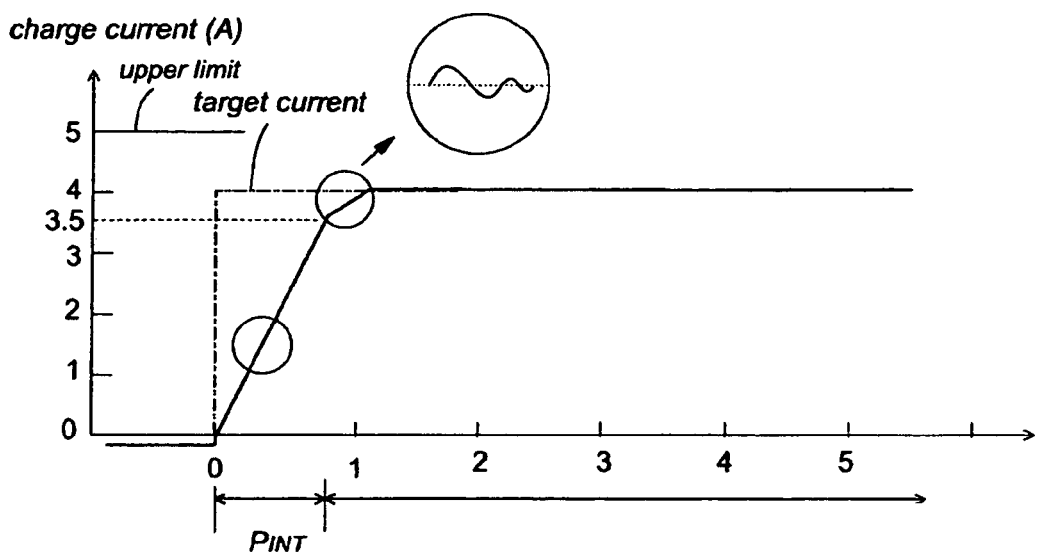
FIG. 3A
FIG. 3B
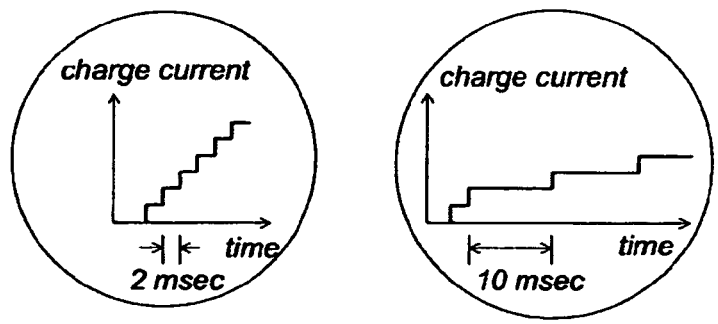
FIG. 6
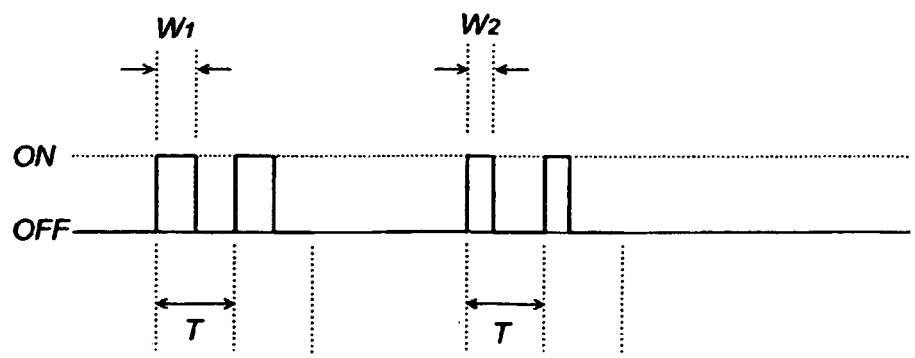

CONSTANT-CURRENT BATTERY CHARGER

TECHNICAL FIELD

The present invention relates to a constant-current battery charger for charging a secondary cell.

BACKGROUND ART

Secondary cells or rechargeable batteries have been widely utilized in power tools, cellular phones, and many other portable electrical devices. In order to charge the cells such as nickel-cadmium batteries and nickel-hydrogen batteries, it has been proposed a constant-current battery charger which supplies a relatively uniform current to the cells. Normally, the constant-charging repeats a cycle of monitoring the charge current being supplied to the cells, comparing the monitored charge current with a target current, and varying the charge current at a uniform charge rate to regulate the current in match with the target current. Therefore, when charging almost exhausted cells, a large number of the above cycles have to be repeated until the charge current comes close to the target current.

The charge rate is selected to a relatively low in order to avoid undesired overshooting or undershooting of the charge current after the charge current comes close to the target current. Accordingly, the above constant-charging scheme is, in principle, difficult to make a rapid increase of the charge current towards the target current when there is a considerable difference therebetween.

Japanese Patent Publication No. 8-336236 may be interpreted to give a solution to make a rapid charging by relying upon a constant-voltage charging instead of the constant-current charging while the charge current is far from the target current. However, since a charge current may be deviated largely from the target current during the constant-voltage charging, there remains a problem that the target current is not expected to be rapidly reached as long as the constant-voltage charging is made, which eventually prolongs a time for reaching the target current.

DISCLOSURE OF THE INVENTION

In view of the above insufficiency, the present invention has been achieved to provide a constant-current battery charger which is capable of increasing the charge current rapidly to the target current for assuring a rapid charging successfully.

The battery charger in accordance with the present invention includes a power supply configured to supply a charge current to a secondary cell, and a current monitor configured to monitor a charge current being supplied to the cell and give a current signal indicative of the charge current. A controller is included to control the power supply for varying the charge current in accordance with the current signal from the current monitor. The controller calculates a current difference between a predetermined target current and the charge current being monitored, and generates a demand of varying the charge current at a first charge rate when the current difference is out of a predetermined range, and varying the charge current at a second charge rate when the current difference is within the predetermined range. The controller generates the demand repeatedly at regular or varying intervals for varying the charge current. The first charge rate is set to be higher than the second charge rate in order to make a rapid charging until it comes close to the target current. Since the current difference between the instant charge current and the target current is relied upon to switch the charge rate between the first and second charge rates, the switching can be made at an exact timing truly indicative of the condition of the battery, which enables a rapid charging, yet assuring to complete the charging successfully. In fact, since the switching of the charge rate is dependent upon the current difference, the charging can be free from being influenced by uncertain characteristic changes which would arise at a transition from the high-rate charging to the low-rate charging when, for example, the cell voltage is relied upon for the switching.

Preferably, the demand is configured to vary the charge current by a constant step each time the demand is generated. In this connection, the controller is configured to vary the interval which is longer when the current different is within the predetermined range than when it is out of the range. Thus, the second charge rate is made smaller than the first charge rate simply by varying the interval.

Alternatively, the controller may be configured to generate the demand repeatedly at regular intervals, while the command is configured to vary the charge current by a varying step which is smaller when the current difference is within the predetermined range than it is out of the predetermined range.

A voltage monitor may be incorporated in the charger to detect a cell voltage developed across the second cell. The controller is configured to shift the target current in accordance with the detected cell voltage while the current difference is within the predetermined range. Therefore, the target current can be shifted in well consideration of the cell voltage in order to continue the constant-current charging successfully for completing the charging successfully, while assuring the rapid charging from the nearly exhausted condition irrespective of the cell voltage.

Further, a temperature monitor may be incorporated in the charger to detect a temperature of the secondary cell. In this case, the controller is configured to shift the target current in accordance with the detected temperature while the current difference is within the predetermined range, i.e., after the charge current is around the target current. Thus, the target current can be shifted in well reflectance of the cell temperature in order to continue the constant-current charging successfully, while assuring the rapid charging from the nearly exhausted condition irrespective of the cell temperature.

When the voltage monitor and the temperature monitor and the voltage monitor are incorporated in the charger, the controller is preferred to give, while the current difference is within the predetermined range, a voltage difference between an instantaneous cell voltage being currently monitored and a previous cell voltage monitored immediately previously, as well as a temperature difference between an instantaneous cell temperature and a previous cell temperature monitored immediately previously. In this connection, the controller generates the demand which varies the charge current at the first charge rate either when the voltage difference is greater than a predetermined reference voltage or when the temperature difference is greater than a predetermined reference temperature, and otherwise keeps the second charge rate. Therefore, when the cell temperature or the cell voltage goes out of the predetermined reference voltage or temperature, the controller acknowledges there is a critical error in the monitored parameters and is responsive to promptly restoring the cell voltage and the cell temperature to correct parameters, and to rely upon the correct parameters for shifting of the target current.

Preferably, the controller is configured to inhibit the power supply from providing the charge current when the charge current goes beyond an upper limit while varying the charge current at the first charge rate. Thus, the charger as well as the secondary cell can be protected from unduly high current which might destroy the charger and the cell.

For more safe operation, the charger may include an interrupter which is connected to the power supply at its front end for connection with an external power source. The interrupter is activated by the controller to disconnect the power supply from the power source when the charge current goes beyond the upper limit while varying the charge current at the first charge rate.

These and still other advantageous features of the present invention will become more apparent from the following detailed description of the embodiment when taken in conjunction with the attached drawings.

BRIEF DESCRIPTION OF THE DRAWINGS

FIG. 2 is a graph illustrating the operation the battery charger in which the charge current is caused to increase;

FIGS. 3A and 3B illustrate how the charge rate is varied in the operation of FIG. 2;

FIG. 6 illustrates another scheme of varying the charge rate.

BEST MODE FOR CARRYING OUT THE INVENTION

Figure 1:
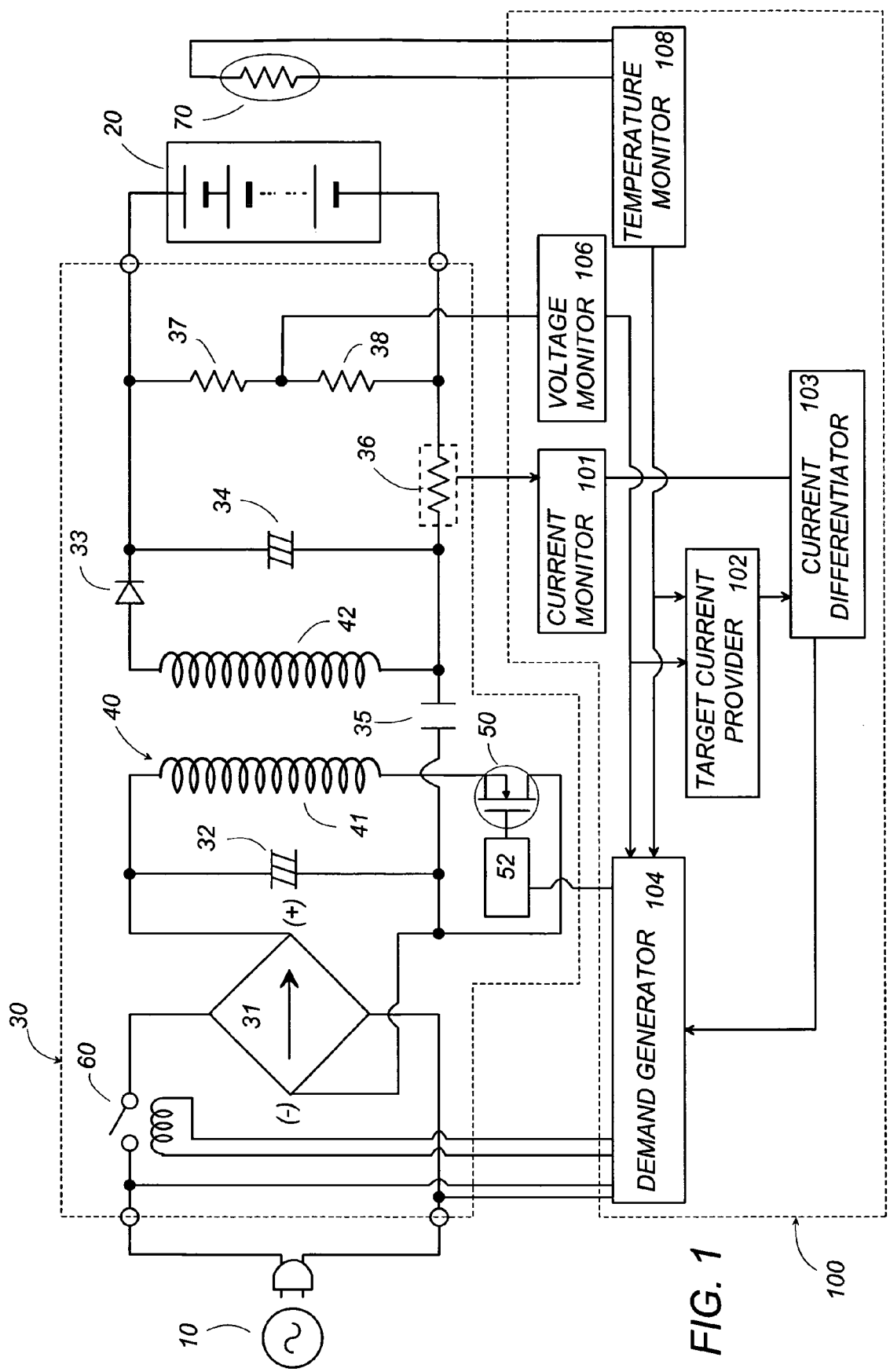
FIG. 1 is a circuit diagram of a battery charger in accordance with a preferred embodiment of the present invention.

Referring now to FIG. 1, there is shown a battery charger in accordance with a preferred embodiment of the present invention. The battery charger includes a power supply 30 configured to receive an AC voltage from an AC power source 10 and convert it into a DC voltage for supplying a charge current for recharging a secondary cell 20. The power supply 30 includes a rectifier 31 in the form of a diode bridge providing a rectified DC voltage which is then smoothed by a capacitor 32 connected across the output of the rectifier 31. Also included in power supply 30 is a transformer 40 with a primary winding 41 connected across the output of the rectifier 31, and with a secondary winding 42 connected across the secondary cell 20. A switching element 50, for example, FET is connected in series with the primary winding 41 across the outputs of the rectifier 31 in order to periodically interrupt the smoothed DC voltage at a high frequency to induce a corresponding AC voltage across the secondary winding 42. The induced voltage is rectified by a diode 33 and smoothed by a capacitor 34 to provide the DC charge current for charging the secondary cell 20. A DC blocking capacitor 35 is connected between a low voltage side output of the rectifier 31 and one end of the secondary winding 42 to isolate the secondary winding 42 from the primary winding 41. A current monitoring resistor 36 is connected in series with the capacitor 34 to give a corresponding voltage indicative of the charge current being supplied to the secondary cell 20. In addition, a voltage divider composed of resistors 37 and 38 is connected across the capacitor 34 to give a cell voltage being applied to the secondary cell 20. Also included in the power supply 30 is an interrupter 60 in the form of an electromagnetic relay for disconnecting the power supply 30 from the power source 10 upon detection of excessive charge current being supplied to the secondary cell 20, as will be discussed later. Further, the charger includes a temperature monitor 70 disposed adjacent to the secondary cell 20 to give a cell temperature thereof.

The battery charger includes a controller 100 which controls the power supply 30 to regulate the charge current basically in accordance with the charge current being monitored. The cell voltage and the cell temperature are also considered to modify the charge current supplied from the power supply 30, as will be discussed later. The controller 100 includes a current monitor 101, a target current provider 102, a current discriminator 103, and a demand generator 104, which are realized in a microprocessor. The current monitor 101 is connected to the resistor 36 to give a signal indicative of the instant charge current being supplied to the secondary cell 20. The target current provider 102 is connected to receive the cell voltage and the cell temperature respectively from the voltage monitor 106 and the temperature monitor 108, and is configured to provide a target current which varies or shifts in accordance with the cell voltage and the cell temperature. The target current and the instant charge current are fed to the current differentiator 103 which calculates a current different therebetween. The demand generator 104 is configured to generate a demand of increasing or decreasing the charge current at different rates depending upon whether the current difference is out of a predetermined range or within the range, in order to rapidly charge the secondary cell 20 from its almost exhausted condition at a high charge rate during an initial period ($P_{INT}$) as shown in FIG. 2, and keeping the continuous charging at a low or moderate charge rate thereafter.

Prior to discussing the operation, it is noted that the demand from the demand generator 104 is fed to a driver 52 of the switching element 50 periodically at varying intervals, for example, between 2 milliseconds (msec) and 10 milliseconds (msec), thereby regulating the charge current each time the demand is generated, in order to approach the instant charge current in mach with the target current by repetitively applying the demand of driving the switching element 50. The duty ratio of the switching element 50 is directly proportional to the charge current being supplied from the power source 30. For example, charge current of 1 A, 2 A, 3 A, 4 A, and 5 A are supplied respectively at the duty ratio of 10%, 20%, 30%, 40%, and 50%.

The operation of the charger is now discussed with reference to FIG. 2, in which the charge current is controlled to increase from below zero to the target current of 4 A determined at the target current provider 102. In this instance, the high charge rate and the low charge rate are set to be respectively 0.1%/2 msec (50%/sec), and 0.1%/10 msec (10%/sec), and the predetermined range is set to be ±0.5 A. Firstly, upon seeing zero current from the current monitor 101, the current differentiator 103 outputs the current difference of 4 A which is far out of the range of ±0.5 A. Thus, the demand generator 104 provides the demand of increasing the charge current at the high charge rate of 0.1%/2 msec (50%/sec) at the fixed intervals of 2 msec, as schematically shown in FIG. 3A. This continues until the instant charge current increases up to 3.5 A, i.e., the current difference comes within the range of ±0.5 A. Immediately after the instant current reaches 3.5 A by repeating to increase the charge current by the high charge rate every 2 msec within the period $P_{INT}$, the demand generator 104 responds to switch the charge rate from the high charge rate of 0.1%/2 msec (50%/sec) to the low charge rate of 0.1%/10 msec (10%/sec) for increasing or varying the charge current moderately. In the present embodiment, the switching to the low charge rate is made by shifting the sampling interval from 2 msec to 10 msec, while keeping the step of increasing the duty ratio by 0.1%, as shown in FIG. 3B, thereby giving the low charge rate of 0.1%/10 msec (10%/sec). Thus, the charge current is caused to vary moderately until the charge current reaches to the target current, i.e. without causing overshooting or undershooting of the charge current. Thereafter, the control is made to keep charge current at target current continuously by varying the instant charge current at the low charge rate or even much lower rate.

The controller 100 monitors the cell temperature, the cell voltage, and a charging time elapsed from the start of charging so as to determine that the secondary cell 20 is fully-charged and stop charging the cell, if either one of the following relations is satisfied.

1) Cell temperature variation per unit time ($\Delta T/\Delta t$) exceeds a predetermined value;
2) Cell voltage drop per unit time ($-\Delta V/\Delta t$) exceeds a predetermined value; and
3) Charging time exceeds a predetermined time.

While continuing the charging, the cell voltage will increase beyond a normal level when the secondary cell 20 sees a battery inactivity, which requires the lowering of the cell voltage by correspondingly lowering the charge current. Also, when the cell temperature is less than a normal temperature, it is required to lower the charge current in consideration of an expected delay in chemical activity of the cell. In either event, the controller 100 responds to delimit the target current to a fixed value in compensation of the battery conditions.

Figure 4:
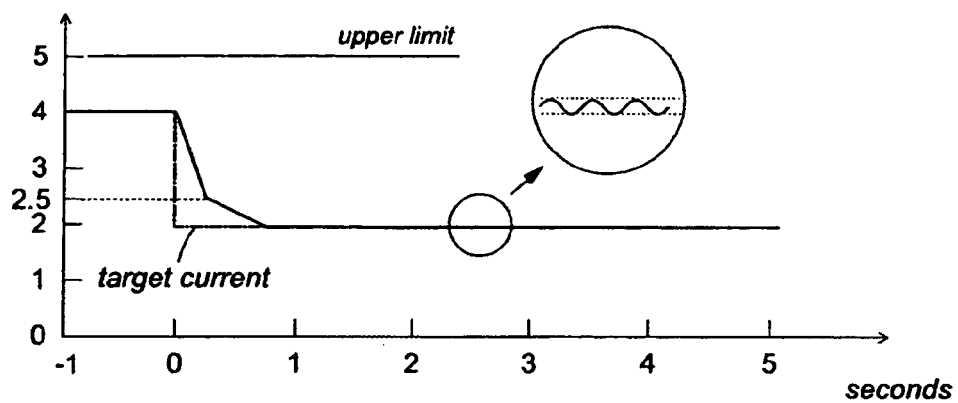
FIGS. 4 and 5 illustrate the operation of the battery charger in which the charge current is caused to decrease.
Figure 5:
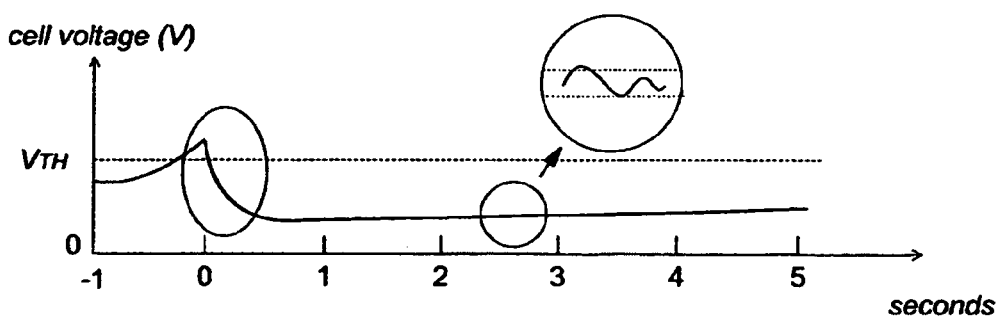

FIGS. 4 and 5 show the delimiting of the target current from the normal value of 4 A to a lowered fixed value of 2 A upon seeing the cell voltage goes high beyond a threshold voltage $V_{TH}$. When the cell voltage goes above the threshold voltage $V_{TH}$, the target current provider 102 responds to delimit the target current, for example, from 4 A to the lowered fixed value of 2 A, as shown in FIG. 4. Upon this occurrence, the current differentiator 103 provides the current difference of 2 A which is out of the predetermined range of ±0.5 A so that the demand generator 104 generates the demand of decreasing the instant charge current at the high rate of 0.1%/2 msec (50%/sec) until the instant charge current decreases down to 2.5 A. Thereafter, the demand generator 104 switches the charge rate from the high charge rate to the low charge rate, decreasing the charge current moderately by the low charge rate of of 0.1%/10 msec (10%/sec) down to the target current of 2 A, and keeping the instant charge current at the target current of the lowered fixed value by continuously varying the charge current at the low rate or even much lower rate.

Once after the cell voltage reaches the threshold voltage $V_{TH}$, the target current is fixed to the lowered fixed value of 2 A, and the cell voltage is not again referred to for the purpose of shifting the target current back to 4 A. It is noted in this connection that while the charge current is varying at the high rate, i.e., the current difference is out of the predetermined range of ±0.5 A, the output of the voltage monitor 106 is disregarded for delimiting the target current because of that the cell voltage is likely to see abrupt change due to the high rate variation of the charge current from the high current to the low current, as seen in the left circle of FIG. 5.

Also, when the cell temperature is found to be lower than a predetermined lower temperature limit, or greater than an upper temperature limit, the target current provider 102 is also responsive to delimit the target current to the lowered fixed value of 2 A from the instant charge current from 4 A, in the like manner as discussed with reference to FIG. 4. It is also noted in this connection that during the transition period of varying the charge current at the high rate, the cell temperature from the temperature monitor 108 is not referred in order to exclude possible fluctuation of the cell temperature occurring in this transition period, thereby shifting the target current reliably in consistent with the detected cell temperature. Further, once after the target current is delimited to the lowered fixed value, the cell temperature is not again referred to for shifting the target current back to 4 A.

Until the target current is delimited to the lowered fixed value and while the charging is kept at the low charge rate, the cell voltage and the cell temperature are monitored at regular intervals of one (1) second, for example, which is considerably longer than the intervals at which the demand of varying the charge current is generated. The controller 100 repeats to execute a validation routine in order to obtain reliable data for the cell voltage and the cell temperature, enabling the delimiting of the target current at exact timing in well reflectance of the data. The validation routine for the cell voltage includes the steps of:

1) obtaining a voltage difference between an instantaneous cell voltage and a previous cell voltage monitored immediately previously,
2) switching the charge current from the low charge rate to the high charge rate temporarily, if the voltage difference becomes greater than a predetermined reference voltage, for example, 0.1 V, in order to bring about a rapid change in the resulting cell voltage, and
3) designating the instantaneous cell voltage as a true cell voltage when the voltage difference is within the reference voltage, and relying upon thus designated cell voltage for delimiting the target current.

Likewise, the validation routine for the cell temperature includes the steps of:

1) obtaining a temperature difference between an instantaneous cell temperature and a previous cell temperature monitored immediately previously,
2) switching the charge current from the low rate to the high rate temporarily, if the temperature difference becomes greater than a predetermined reference temperature, for example, 3° C., in order to bring about a rapid change in the resulting cell temperature, and
3) designating the instantaneous cell temperature as a true cell temperature when the temperature difference is within the reference temperature, and relying upon thus designated cell temperature for delimiting of the target current.

When the cell voltage and/or the cell temperature fluctuate considerably due to external noises or any other reasons, the controller 100 acknowledges that these parameters are not reliable and forces to make the high rate charging rather than the low rate charge temporarily, thereby pulsating the cell voltage and the cell temperature to obtain the reliable data. Since the above validating routine is made while the charge current is kept close to the target current, i.e. the current difference is within the predetermined range of ±0.5 A, a stable change in the cell voltage and the cell temperature is expected by the temporarily switching to the high rate charging from the low rate charging, giving the reliable data for modification of the target current.

While the low rate charging continues before or after the target current is delimited, the cell temperature is constantly monitored for protection of the secondary cell 20. When the cell temperature exceeds a maximum temperature or falls below a minimum temperature, the controller 100 goes into a standby mode in which the demand generator 104 issues a null demand of inactivating the switching element 50 to cease the operation of the power supply 30. This continues until a predetermined time is elapsed or the cell temperature settles between the maximum and minimum temperature. If the predetermined time is elapsed, the controller 100 is responsive to open the relay 60 to disconnect the power supply 30 from the external power source 10, thereby shutting down the charger. When the cell temperature goes back into the normal range between the maximum and minimum temperature within the predetermined time, the controller 100 is responsive to come back into the normal charging mode from the standby mode, continuing the low rate charging for approaching or keeping the charge current to and at the target current In this case, the target current may be modified in accordance with the monitored cell voltage.

In an event that the charge current increases excessively, the controller 100 is configured to protect the secondary cell 20 and the power supply 30. For this purpose, the demand generator 104, in response to that the charge current exceeds a predetermined upper limit, issues a stop demand which inactivates the switching element 50 to cease the operation of the power supply 30, and at the same time opens the relay 60 to disconnect the power supply 30 from the external power source.

In the above embodiment, the switching of the charge rate is realized by varying the intervals at which the demand is generated, while keeping a constant step by which the charge current varies each time the demand is generated. Alternatively, it is equally possible to fix the intervals, while varying the step each time the demand is generated. The step may be varied by varying the duty ratio or the frequency for driving the switching element 50. In this modification, the step of varying the charge current is configured to be smaller when the current difference is within the predetermined range than when it is out of the range. As shown in FIG. 6, on-period (W1, W2) of the switching element is adjusted with the pulse period (T) being fixed for varying the duty ratio, or the pulse period (T) is adjusted with the on-period being fixed.

The values or thresholds disclosed in the above embodiment are only for an exemplary purpose, and therefore should not be interpreted to delimit the scope of the invention.

The invention claimed is:

1. A battery charger for charging a secondary cell, said charger comprising:
   a power supply configured to supply a charge current to said secondary cell;
   a controller including a current monitor which is configured to monitor a charge current being supplied to said cell and give a current signal indicative of the charge current;
   said controller configured to control said power supply for varying the charge current in accordance with said current signal from said current monitor;
   said controller calculating a current difference between a predetermined target current and the charge current being monitored,
   said controller generating a control signal of varying the charge current at a first charge current increasing rate when said current difference is out of a predetermined range, and varying the charge current at a second charge current increasing rate when said current difference is within said predetermined range, the first charge current increasing rate being set to be greater than the second charge current increasing rate;
   said controller generating said control signal repeatedly at predetermined intervals for varying the charge current.

2. The battery charger as set forth in claim 1, wherein said control signal varies the charge current by a constant step each time the control signal is generated,
   said controller being configured to vary the interval which is longer when said current difference is within said predetermined range than when it is out of said predetermined range.

3. The battery charger as set forth in claim 1, wherein said controller is configured to generate said control signal repeatedly at regular intervals,
   said control signal varying the charge current by a varying step which is smaller when said current difference is within said predetermined range than when it is out of said predetermined range.

4. The battery charger as set forth in claim 1, further including:
   a voltage monitor which is configured to detect a cell voltage developed across said second cell,
   said controller being configured to shift said target current in accordance with the detected cell voltage of said cell while said current difference is within said predetermined range.

5. The battery charger as set forth in claim 1, further including:
   a temperature monitor which is configured to detect a temperature of said secondary cell,
   said controller being configured to shift said target current in accordance with the detected temperature of said cell while said current difference is within said predetermined range.

6. A battery charger for charging a secondary cell, said charger comprising:
   a power supply configured to supply a charge current to said secondary cell;
   a controller including a current monitor which is configured to monitor a charge current being supplied to said cell and give a current signal indicative of the charge current;
   said controller configured to control said power supply for varying the charge current in accordance with said current signal from said current monitor;
   said controller calculating a current difference between a predetermined target current and the charge current being monitored,
   said controller generating a control signal of varying the charge current at a first charge current increasing rate when said current difference is out of a predetermined range, and varying the charge current at a second charge current increasing rate when said current difference is within said predetermined range, the first charge current increasing rate being set to be greater than the second charge current increasing rate;
   said controller generating said control sianal repeatedly at predetermined intervals for varying the charge current, said battery charger further including:
   a voltage monitor configured to detect a cell voltage developed across said second cell,
   a temperature monitor configured to detect a cell temperature of said secondary cell, said controller being configured to shift said target current in accordance with the detected cell voltage and the cell temperature while the current difference is within said predetermined range, said controller being configured to give, while said current difference is within said predetermined range, a voltage difference between an instantaneous cell voltage being currently monitored and a previous cell voltage monitored immediately previously, said controller being configured to give, while said current difference is within said predetermined range, a temperature difference between an instantaneous cell temperature being currently monitored and a previous cell temperature monitored immediately previously, said control signal being configured to vary the charge current at said first charge current increasing rate either when said voltage difference is greater than a predetermined reference voltage or when said temperature difference is greater than a predetermined reference temperature, and otherwise to vary the charge current at said second charge current increasing rate.

7. The battery charger as set forth in claim 6, wherein said controller is configured to give the voltage difference and the temperature difference at intervals longer than said intervals at which the control signal is generated.

8. The battery charger as set forth in claim 1, wherein said controller is configured to inhibit said power supply from providing said charge current when said charge current goes beyond an upper limit while varying the charge current at said first charge current increasing rate.

9. The battery charger as set forth in claim 8, further including:

an interrupter connected to said power supply at its front end for connection with an external power source, said controller activating said interrupter to disconnect said power supply from said power source when said charge current goes beyond the upper limit while varying the charge current at said first charge current increasing rate.

* * * * *